United States Patent [19]
Crewe et al.

[11] Patent Number: 5,818,605
[45] Date of Patent: Oct. 6, 1998

[54] METHOD AND APPARATUS FOR HIGH RESOLUTION SENSING OF ENGRAVING STYLUS MOVEMENT

[75] Inventors: Albert Crewe, Palos Park; George B. Thiel, Wheaton; Douglas R. Adler; Riyazhassan M. Asaria, both of Chicago, all of Ill.

[73] Assignee: R.R. Donnelley & Sons Company, Chicago, Ill.

[21] Appl. No.: 699,528

[22] Filed: Aug. 19, 1996

[51] Int. Cl.⁶ .................................................. B41C 1/04
[52] U.S. Cl. ............................................................ 358/299
[58] Field of Search ........................... 358/299; 382/141; 364/474.02, 474.19, 474.28, 474.34, 474.35, 474.37, 148.165; 356/378.379

[56] References Cited

U.S. PATENT DOCUMENTS

| | | | |
|---|---|---|---|
| 4,805,312 | 2/1989 | Dätwyler | 358/299 X |
| 5,029,011 | 7/1991 | Fraser | 358/299 |
| 5,036,403 | 7/1991 | Hupka et al. | 358/299 |
| 5,422,958 | 6/1995 | Wouch et al. | 358/299 X |
| 5,438,422 | 8/1995 | Holowko et al. | 358/299 |
| 5,440,398 | 8/1995 | Holowko et al. | 358/299 |
| 5,621,533 | 4/1997 | Holowko et al. | 358/299 |
| 5,652,659 | 7/1997 | Bornhorst, Jr. et al. | 358/299 |

OTHER PUBLICATIONS

Dambrot, Stuart M., "Japanese Researchers Push Electron Holography; Rarely Used in this Country, the Technique could Become a Powerful Tool for High–Temperature Superconductivity Studies," *Science,* vol. 346, Oct. 6, 1989, p. 31.

Dickman, et al., "A Crystal–Clear View of the World's Tiny Wonders," *Business Week,* Nov. 3, 1986, p. 134.

Ito, et al., "Improvement of Focusing and Tracking Servos in Optical Disk Memory," *SPIE,* vol. 529, Optical Mass Data Storage, Jan. 22–24, 1985, pp. 145–149.

Ruzic, Neil P., "Technologies Emerged: Once and Future Themes of Industrial Research, Silver Yearbook," *Research and Development,* Jun. 1984, p. 276.

*Primary Examiner*—Peter S. Wong
*Assistant Examiner*—Gregory J. Toatley, Jr.
*Attorney, Agent, or Firm*—Arnold, White & Durkee

[57] ABSTRACT

Method and apparatus for high resolution sensing of engraving stylus movement for dynamic control of an engraving machine while engraving, improved calibration and as a tool used to assist in selecting acceptable gravure cylinders and improving the manufacturing process of making gravure cylinders is described. A variety of sensors are described in conjunction with measuring engraving stylus movement, specifically, sensors that measure small changes in capacitance, resistance, impedance, optical reflections, optical interference patterns, induced eddy currents and voltages induced in a two-material piezoelectric rod which corresponding to positional changes of the engraving stylus.

70 Claims, 8 Drawing Sheets

METHOD AND APPARATUS FOR HIGH RESOLUTION SENSING OF ENGRAVING STYLUS MOVEMENT

FIELD OF THE INVENTION

The present invention is related to high resolution sensing of engraving stylus movement for performing control and calibration of engraving machines and also for providing information for the improvement of the manufacturing process of gravure cylinders. The present invention employs a sensor to accurately sense engraving stylus movement. Information from the sensor is used in a feedback loop to control the engraving machine while it is engraving a gravure cylinder. Information from the sensor is also used to calibrate the engraving machine between engravings and provide information about the quality of the gravure cylinder helpful to improving the process of manufacturing gravure cylinders.

BACKGROUND OF THE INVENTION

Engraving machines are employed to engrave gravure cylinders used for gravure printing. Gravure printing employs an engraved gravure cylinder loaded into a printing press. Gravure cylinders have been engraved with an engraving head of a machine such as a Helio-Klischograph manufactured by Dr. Ing. Rudolf Hell GmbH, München (Munich), Germany. The engraving head uses a diamond stylus to engrave cells into the gravure cylinder having an outer copper surface. A cell is the resultant indentation formed in an outer copper surface of the gravure cylinder.

The actual engraving process is done at the rate of several thousand cells per second. The quality of the final printed product depends upon achieving the correct sequence of cell sizes on the cylinder. Cells are engraved into the gravure cylinder in patterns forming the text and other images to be printed. Specifically, the cells are depressions in the surface of the gravure cylinder that are filled with ink during the printing process. In order to print, the outer surface of an engraved gravure cylinder is coated with ink. Excess ink, that is ink not contained by the cells, is removed with a doctor blade, thus preventing ink from being deposited onto a non-printing area. The shape of each cell dictates how much ink that cell will hold, and correspondingly, how big an ink dot will appear in print. Even small variations in cell size can produce changes in dot size noticeable to the human eye. Without relatively precise control over cell size the patterns of dots will become undesirably distorted. For example, cells that are too small will produce images that are too light. Conversely, cells that are too large will produce images that are too dark. In either case essential details in the image can become unrecognizable. Moreover, if the image is too dark then not only are the details lost, but ink is being wasted. Therefore, it is desirable to be able to control all aspects of the engraving process necessary to produce accurate printing.

One aspect of producing accurate printing is calibrating the engraving machine. In order to calibrate the engraving machine, current methods depend upon issuing a series of digital engraving commands to the engraving machine to cause the diamond stylus point to indent a gravure cylinder's copper surface in order to produce cells of various sizes. A test pattern of cells is often engraved into the gravure cylinder prior to the actual engraving of the final printed surface. Typically, after all the test cells are engraved, a technician using precision optical equipment will measure various spatial parameters of the cells in order to estimate actual cell volume. The estimate of actual cell volume is compared with the machine commands issued in order to determine how to calibrate the engraving machine. The most recently engraved cylinder tested in this fashion is used to calibrate the engraving machine. Once calibrated, the machine will engrave the next gravure cylinder before it is calibrated again. Currently, the accuracy of the engraver is completely dependent upon calibration.

Unfortunately, current methods of calibration fail on several fronts. Optical calibration is labor intensive and not always accurate. It would be desirable to provide a less labor intensive and more accurate way of calibrating engraving machines. Even when an engraving machine is well calibrated, things often go wrong. For instance, the diamond stylus will wear over time and the engraving machine will eventually go out of calibration. It would be desirable to be able keep an engraving machine in calibration for a longer period of time.

Even if the engraving machine remains calibrated for a substantial period of time, it has been discovered by the inventors that even when two different gravure cylinders have substantially identical hardnesses, and identical engraving commands are issued to engrave the cylinders, the resultant cells formed on the gravure cylinders are sometimes substantially different. Thus, it has been discovered by the inventors that gravure cylinders vary in engravability, i.e., a gravure cylinder's susceptibility to being engraved, between each gravure cylinder in any given batch of cylinders. Furthermore, cylinders may even vary in engravability over the surface of the same cylinder. Even with the best possible single calibration of the engraving machine, it is likely that some cells are going to contain too great a volume and others too little because of the variation in engravability of the gravure cylinder surfaces. Therefore, it would be desirable to be able to more accurately engrave gravure cylinders regardless of individual variations in engravability between different gravure cylinders and different areas on each gravure cylinder.

Efforts to control the uniformity of gravure cylinder engraving have focused primary on the engraving process, but as discussed above, it has been discovered that gravure cylinders themselves vary in their susceptibility to engraving. This variability is thought to arise, at least in part, from differences in the chemical baths gravure cylinders are immersed in during copper plating and environmental differences during post-plating storage and handling. It would be desirable to provide information on specific engravability variations to gravure cylinder manufacturers. In combination with detailed data on manufacturing conditions, the engravability information could be used to improve the manufacturing process.

SUMMARY OF THE INVENTION

The present invention relates to an apparatus and method for controlling an engraving machine by dynamically calibrating and adjusting the engraving machine while an actual engraving job is being performed. The present invention also improves the calibration process between gravure cylinder engravings and is used to select acceptable gravure cylinders within a specified range of engravability. Furthermore, the present invention uses information derived from dynamic calibration to improve the manufacturing process of gravure cylinders. The present invention employs highly accurate sensing of engraving stylus movement in order to provide a basis for controlling and calibrating an engraving machine. Engraving stylus movement is initiated by digitally encoded engraving commands transmitted to the engraving machine and is directly proportional to diamond stylus penetration of a gravure cylinder, which in turn is proportional to the volume of the engraved cell. Note that it is within the scope of this invention to employ analog engraving commands to control engraving stylus movement. The present invention dynamically determines each cell's depth, which is proportional to volume, then compares that information with the engraving command given to create the cell to determine an error factor. The error factor is used to determine the proper compensation for the next cell to be engraved and accordingly adjust the next engraving command to more accurately produce the next cell at the desired cell depth and volume.

According to one embodiment of the present invention the entire error determination and adjustment sequence is sufficiently fast to occur between the performance of each engraving command by the engraving machine. For example, an engraver running at 5,000 indentations per second would allow 200 $\mu S$ (microseconds) between each cell engraved. Alternatively, less frequent error determination and subsequent engraving command adjustment is within the scope of the invention, but is less preferable. According to one preferred embodiment of the present invention, the amount of engraving command compensation would be determined and applied dynamically as the engraving process proceeds, for example, in less than 200 $\mu S$. In effect, the present invention employs a negative feedback loop. Negative feedback works to minimize over-engraving and under-engraving by forcing the engraving commands to cause the lowest amount of error they can, within the resolution of the system. In this manner the engraving machine would vary its response to the actual depth of penetration for each command, thereby accounting for variations in engravability. Accordingly, the present invention would ensure the production of relatively error-free gravure cylinders, making the gravure process inherently more precise and economical. Such gravure cylinders produce cleaner printed images and waste much less ink.

In an alternative embodiment, the present invention is used to provide a faster and more accurate method of calibrating the engraving machine between engravings. The present invention provides a more precise indication of engraving stylus movement that enables a better calibration to be made. The present invention eliminates the need for comparison by a person with a microscope.

The engraving stylus moves through a very small range of distance, approximately 100 $\mu M$ (micrometers). A stylus sensor employed in accordance with the present invention is capable of accurately detecting such small ranges of motion. All the sensing arrangements described below by way of example are capable of sensing such high resolution.

The measurement of engraving stylus movement, thus depth of a cell, can be done in various ways. The following are examples of measurement techniques which allow the measurement to be done in the time frame desired. It should be emphasized that this list of possible methods is illustrative and not exclusive because other methods could be used. Moreover, it is considered within the scope of the invention to employ two or more methods simultaneously or sequentially to lead to a further improvement in accuracy.

In one embodiment, the stylus sensor is a capacitive sensor that detects engraving stylus movement through the addition of three plates, two plates being attached to the engraving head and one plate being positioned on or attached to an end of the engraving stylus through an arm. A constant frequency voltage is applied between the plates. Movements of the engraving stylus cause the distance between the stylus and the plates to vary, causing a corresponding change in capacitance between them. The change in capacitance causes a change in current through capacitor which is detected and converted into an indication of the distance traversed by the engraving stylus. The change in capacitance modulates the current at the frequency of the stylus. Note that in all examples described herein, electronic means, such as a microprocessor, are used to perform calculations needed to determine the error factor and accordingly adjust the next engraving command.

In another embodiment, the stylus sensor is a resistive sensor that detects changes in the amount of electrical resistance through an engraving diamond mounted on the engraver and the gravure cylinder. As the diamond comes into contact and penetrates the gravure cylinder's copper coating an electrical connection is made and the electrical resistance will sharply decrease, thus allowing the point at which the diamond contacted the gravure cylinder to be ascertained for purposes of calibrating the engraver. Although diamond has relatively high electrical resistance, this resistance can be adjusted through illumination because diamond is a photoconductor. The diamond's resistance can be adjusted to be within a reasonable range for measurements to be made accurately. A variation on this embodiment measures impedance instead of resistance using an alternating current voltage.

In another embodiment the stylus sensor employs a laser which generates a laser beam to measure the movement of a reflective surface, e.g., a mirror, positioned on or attached to the engraving stylus. In this method a laser beam is passed through a beam splitter mounted on the engraving head. The beam splitter splits some of the laser beam off at an angle, while passing some of the laser beam through the beam splitter to the mirror. A portion of the laser beam is reflected off of the mirror back towards the beam splitter. Some of the reflected laser beam is further redirected by the beam splitter onto a split photodetector. The position of the laser beam on the photo detector will depend strongly on the position of the mirror attached to the engraving stylus. As the stylus moves relative to the engraving head that the laser, beam splitter and split photodetector are mounted on, the position of the light on the split photodetector moves accordingly. The position of the light on the split photodetector is converted into a measurement of the distance the stylus moved relative to the gravure cylinder.

In a less preferred, alternative embodiment the stylus sensor employs a half silvered mirror with a laser to measure the movement of a reflective surface positioned on or attached to the engraving stylus. In this method a planar laser beam is passed through a partially reflecting mirror (a half silvered mirror) mounted on the engraving head. The laser beam is reflected from a reflecting surface attached to the engraving stylus. A portion of the reflected laser beam is again reflected off of the partially reflecting mirror onto a split photodetectors where the light of the laser beam is converted into electrical signals. A difference method is employed to calculate the change in signals which is used to determine the amount of engraving stylus movement and cell depth.

In a less preferred, alternative embodiment the stylus sensor employs a half silvered mirror with a laser to measure the movement of a reflective surface positioned on or attached to the engraving stylus. In this method a planar laser beam is passed through a partially reflecting mirror and a lens of short focal length mounted on the engraving head. The lens focuses the light onto the mirror attached to the engraving stylus. The light reflected from this mirror passes back through the same lens and is reflected by the partially reflecting mirror onto a photo detector. The position of that reflected beam on the photo detector will depend strongly on the position of the mirror attached to the engraving stylus. As the stylus moves relative to the engraving head, that the mirror, lens and detector are mounted on, the position of the light on the photodetector moves accordingly. The position of the light on the photo detector is converted into a measurement of the distance the stylus moved relative to the gravure cylinder.

In another embodiment, an interference method is employed that essentially splits a laser beam to use one half as a reference beam and the other half as a measurement beam. The measurement beam is reflected off of a reflecting surface attached to the engraving stylus which causes it to move with the engraving stylus. The reflected measurement beam interferes with the reference beam causing an interference pattern to change. A photodetector similar to the one used in the optical method described above is employed to measure the shift and change in interference pattern. The number and position of interference fringes varies with the change in stylus position. In one preferred embodiment the number of interference fringes is counted to provide an indication of stylus movement. The change in interference pattern corresponds to the change in position of the stylus and cell volume which is calculated with electronic means such as a microprocessor.

In another embodiment, piezoelectric materials, which are known to exhibit reversible electrostriction, are employed to measure changes in engraving stylus position. Many materials are known which exhibit reversible electrostriction phenomena. In one embodiment a rod made of two halves, each half with a different piezoelectric material longitudinally attached together, is connected between the engraving stylus and the engraving head. As the engraving stylus moves relative to the engraving head the rod is alternately bent and straightened. Each time the rod is bent a different voltage will appear at laterally adjacent points in each piezoelectric material. The difference in voltage between laterally adjacent points is electrically sensed and used to derive the corresponding change in engraving stylus position.

In another embodiment, the stylus sensor is an eddy current sensor mounted on the engraving stylus. As the engraving stylus engraves the gravure cylinder the distance between the gravure cylinder and the engraving stylus varies. Eddy currents induced in the gravure cylinder vary proportionally to the distance. The variation in eddy currents is detected and used to ascertain the distance traveled by the engraving stylus.

In yet another embodiment, the stylus sensor senses eddy currents induced in the gravure cylinder by a magnetic field. Unlike the previously described embodiment, the sensor is mounted on the engraving head, not on the engraving stylus. The stylus sensor sense the movement of the back of the engraving stylus as it engraves the cylinder. This embodiment has the advantage of not requiring the sensor to be mounted on the moving engraving stylus itself.

BRIEF DESCRIPTION OF THE DRAWINGS

Other advantages of the invention will become apparent upon reading the following detailed description and upon reference to the accompanying drawings, in which.

DETAILED DESCRIPTION OF PREFERRED EMBODIMENT

The present invention relates to an apparatus and method for dynamically calibrating an engraving machine having an engraving stylus used to engrave gravure cylinders and for providing information to improve the manufacturing process of gravure cylinders. More specifically, the present invention employs one or more of a variety of high resolution sensing techniques to determine actual changes in engraving stylus position in order to calculate the amount of error present and dynamically calibrate subsequent engraving commands to produce more accurate engraving. Information generated from the dynamic calibration described is also used to provide information about the physical characteristics of gravure cylinders.

Accurate measurement of changes in position are used to control the engraving machine and to compare the actual motion of the engraving stylus to the motion expected. The comparison is used to calculate engravability of the gravure cylinder being tested.

Figure 1A:
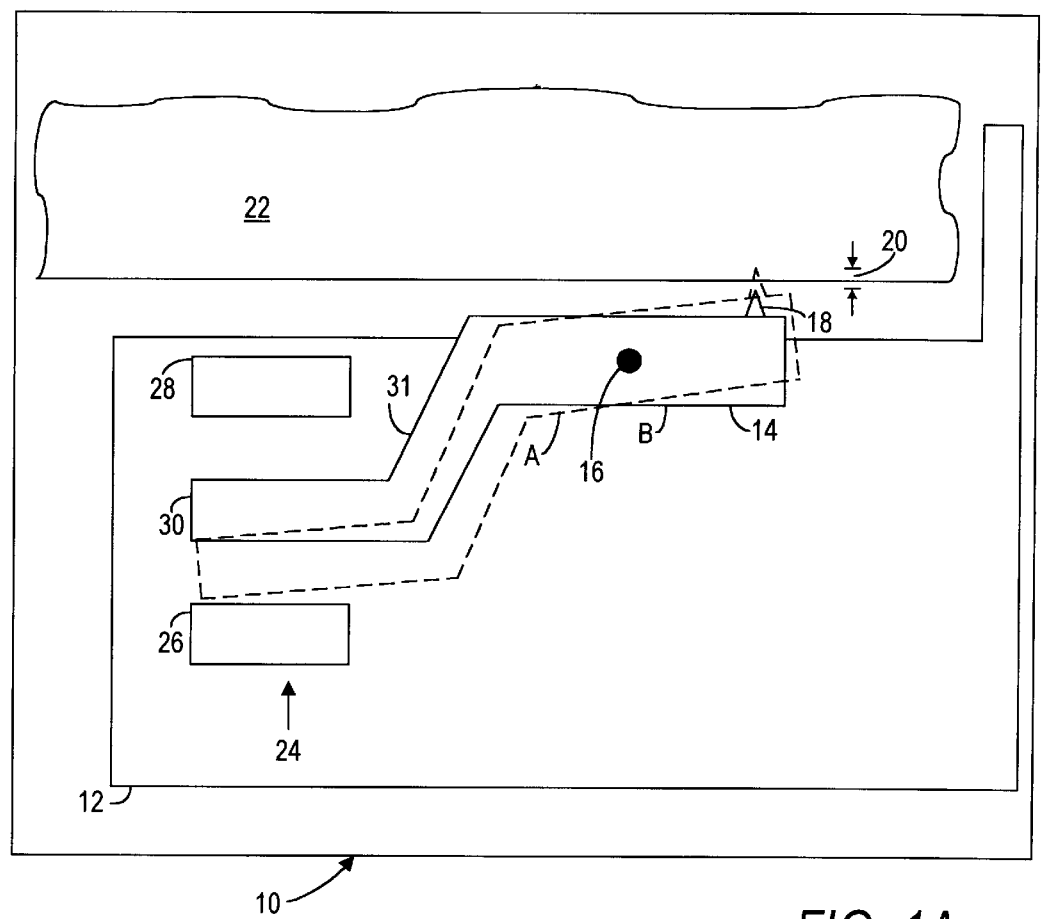
FIG. 1A is a top view of an engraving machine with a stylus sensor for sensing variations in capacitance as an indication of engraving stylus movement.
Figure 2:
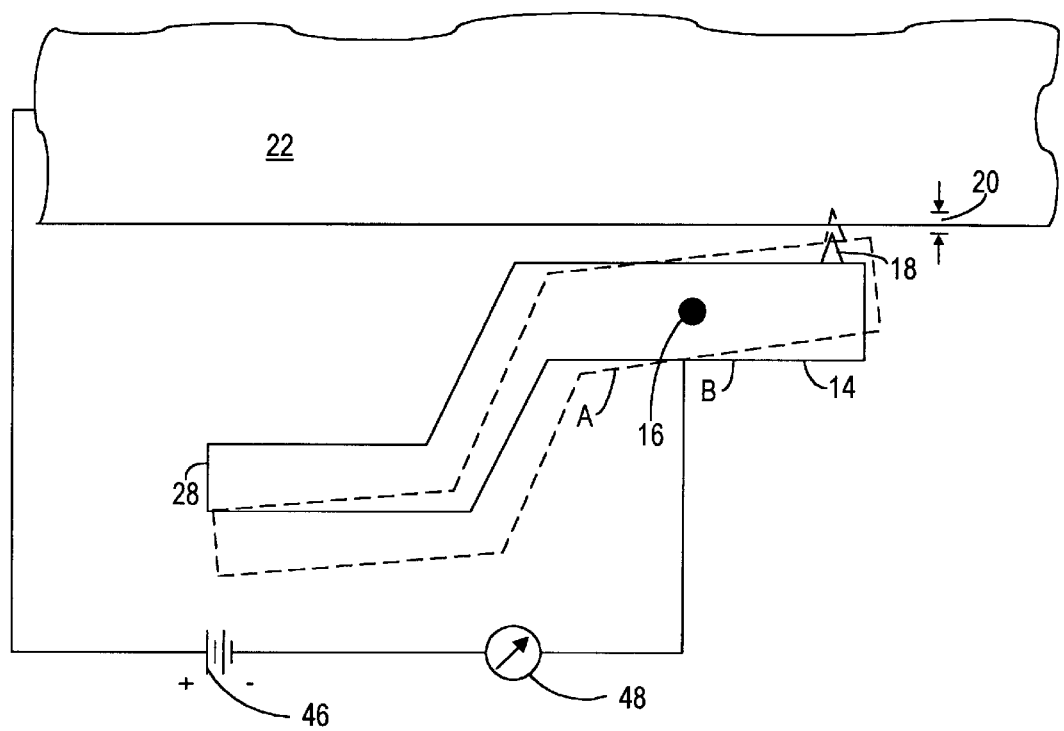
FIG. 2 is a representative schematic view of an engraving machine with a stylus sensor for sensing changes in electrical resistance or impedance between a diamond on an engraving stylus and a copper sheet as an indication of engraving stylus movement.
Figure 5:
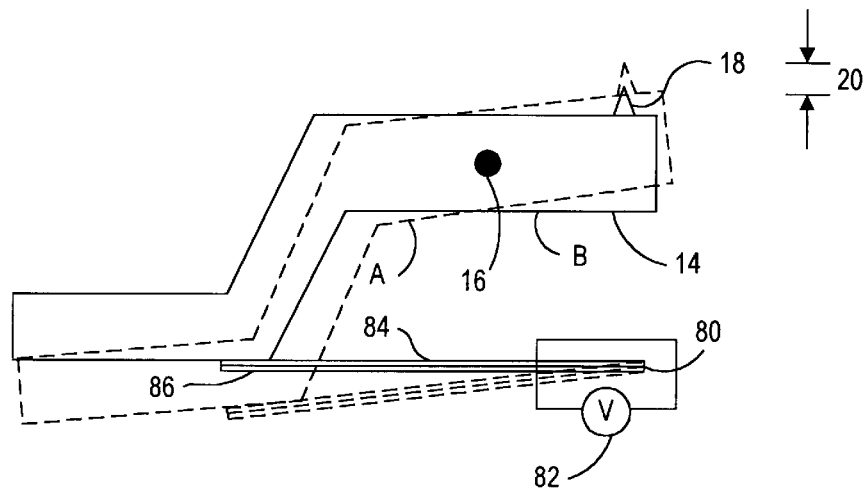
FIG. 5 is a top view of an engraving machine with a stylus sensor for sensing variations in voltage in a rod made of piezoelectric materials.

Referring now generally to the FIGS. 1A, 2, and 5, and more particularly to FIG. 1A, an engraving machine 10 contains an engraving head 12 with an engraving stylus 14. The engraving stylus 14 is mounted on, and moves radially around, a pivot 16. The pivot 16 is attached to the engraving head 12. The engraving stylus is shown in FIG. 1A in its fully extended position "A" and its fully retracted position "B" (not to scale). In one embodiment the engraving machine 10 is a Helio-Klischograph manufactured by Dr. Ing. Rudolf Hell GmbH (Klischograph) of Munich, Germany. The engraving machine 10 receives a digital number representing an amount of distance a diamond 18 part of the engraving stylus 14 is to travel. The digital number is input to the engraving machine 10 and converted to an output voltage that correspondingly causes a responsive movement 20. The engraving stylus' 14 responsive movement 20 occurs when the engraving stylus 14 rotates slightly around the pivot 16. The diamond 18 has a range of motion that is only approximately 100 µM (micrometers), however, this is sufficient to test and engrave a gravure cylinder 22.

To engrave a gravure cylinder 22, the engraving stylus 14 will force the diamond 18 into contact with the gravure cylinder 22 to form a cell (corresponding to the diamond's 18 dashed line position inside of the cylinder 22 in position "B").

The present invention includes an engraving stylus sensor 24 which measures the engraving stylus' 14 responsive movement 20 by measuring the actual distance traversed by the engraving stylus 14. It has been discovered that accurate measurement of the responsive movement 20 of the engraving stylus 14 caused by a specific command is useful for controlling the engraving machine 10 by dynamically calibrating the engraving machine 10 between the performance of each engraving command. Accurate measurement of the responsive movement 20 of the engraving stylus 14 caused by a specific command is also useful for determining gravure cylinder engravability.

Described below are seven different kinds of high resolution sensors used measure changes in position of an engraving stylus 14, i.e., the responsive movement 20. The present invention is not limited to these seven types of sensors which are illustrations of different embodiments of the present invention. Moreover, more than one stylus sensor 24 can be employed.

Figure 1B:
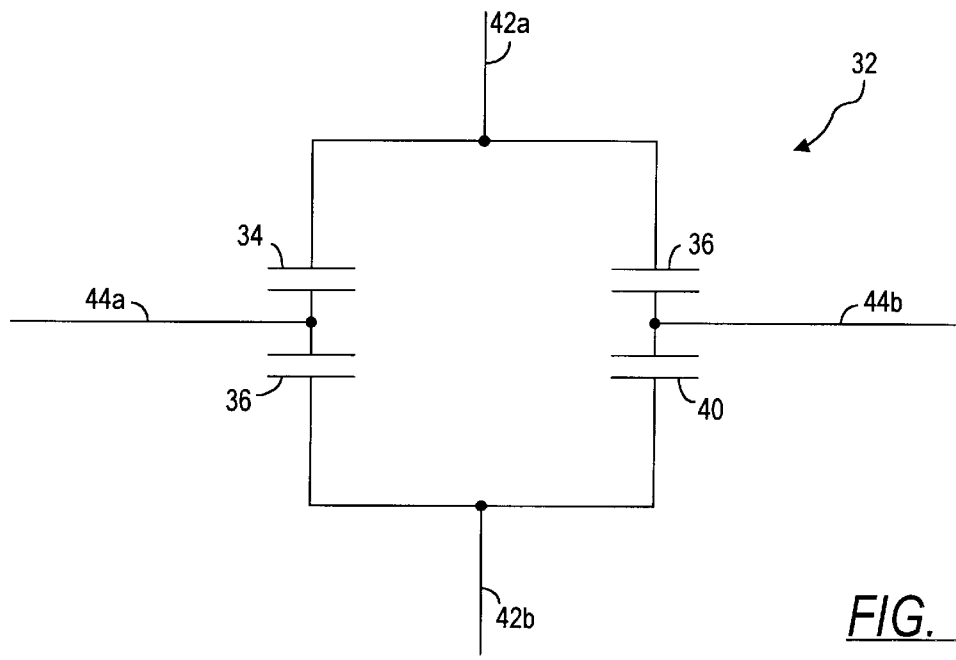
FIG. 1B is a partial schematic diagram of a circuit containing the stylus sensor of FIG. 1A.

One type of stylus sensor 24 for sensing the engraving stylus' 14 responsive movement 20 is implemented through the use of a first capacitive sensor plate 26 and a second capacitive sensor plate 28. Both the first plate 26 and the second plate 28 are metal plates attached to the engraving head 12. One end of the engraving stylus 14 is attached to a third capacitive sensor plate 30 through a arm 31. The third sensor plate 30 is also a metal plate similar to the first plate 26 and the second plate 28. The three plates 26,28,30 form two capacitors in a four capacitive bridge network 32 shown in FIG. 1B.

The capacitor bridge 32 is known to have desirable electrical stability when employed in real environments that vary in temperature and humidity, etc. The first plate 26 and the second plate 28 are in a fixed position with regard to the third plate 30. The first plate 26 and the third plate 30 form first capacitor 34, while the second plate 28 and the third plate 30 form second capacitor 36. A third capacitor 38 is connected to the first capacitor and a fourth capacitor 40. The first capacitor 34 is connected to the second capacitor 36 and the third capacitor 38. Finally, the fourth capacitor 40 is connected to the second capacitor 36 and the third capacitor 38. The third capacitor 38 and fourth capacitor 40 are components whose capacitive values are selected to balance out environmental effects of the kind expected to be experienced by the three plates 26,28,30, as is known in the art.

During engraving, when the engraving stylus 14 moves in response to a command, the distance between the three plates 26,28,30 varies, thus correspondingly varying the capacitance of the first and second capacitors 34,36. This variation in capacitance is detected by applying an constant AC (alternating current) voltage to the four capacitor bridge network 32 on wires at supply voltage points 42a,42b and measuring the voltages present on wires at measurement points 44a,44b. The voltages measured at measurement points 44a,44b will vary correspondingly to the change in capacitance which will vary correspondingly to the change in distance between the three plates 26,28,30, which indicates the distance moved by the diamond 18 on the engraving stylus 14. Thus, the change in capacitance is detected electronically and converted into numbers corresponding to actual engraving stylus 14 movement. Stylus movement is itself converted into cell volume which is compared with the desired volume as indicated by the engraving command, to generate an indication of error. The amount of error is used to calibrate, i.e., correct, the next engraving command received by the engraving machine 10. In one embodiment of the present invention the entire process takes less than 200 µS and occurs after each engraving command.

As illustrated in FIG. 2, in another embodiment the stylus sensor 24 measures changes in resistance caused by penetration of the diamond 18 into the gravure cylinder 22. The diamond 18 is a poor electrical conductor while the copper coating on the gravure cylinder 22 is an excellent conductor of electricity. In the present invention, the value of the resistance as measured between the copper and the body of the diamond 18 will vary according to the depth of penetration of the diamond 18 into the copper. A voltage source 46 applies a direct current ("DC") voltage across the copper coating of the gravure cylinder 22, the diamond 18, and the engraving stylus 14 (which has little resistance). Note that the voltage source 46 could alternatively be of the alternating current ("AC") type for sensing impedance. A current meter 48 measures current flow when the voltage is applied. As the diamond approaches and contacts the gravure cylinder the amount of current will go from virtually zero to a measurable quantity. The amount of current flowing is proportional to the distance the diamond 18 had penetrated the gravure cylinder 22. As the diamond 18 tip approaches and contacts the copper surface of the gravure cylinder 22, current will flow between them in a characteristic pattern. From the pattern the exact moment of contact can be determined. Knowing the lowest amount of resistance between the diamond during performance of the engraving command enables the present invention to calculate the depth of penetration of the diamond 18 into the gravure cylinder 22. This information is used to calculate the amount of error and calibrate the next engraving command as described above.

Instead of resistance, changes in impedance can be measured. The stylus sensor 24 is employed to measure not only when the diamond 18 tip makes contact with the copper coating of gravure cylinder 22, but how far into the copper coating the diamond 18 travels. This is because as the diamond 18 moves into the copper it deforms it with an accompanying change in impedance. This change in impedance is sensed, converted into a digital signal, and subjected to digital signal processing which correspondingly produces an indication of how far into the copper the diamond 18 has progressed.

Figure 3A:
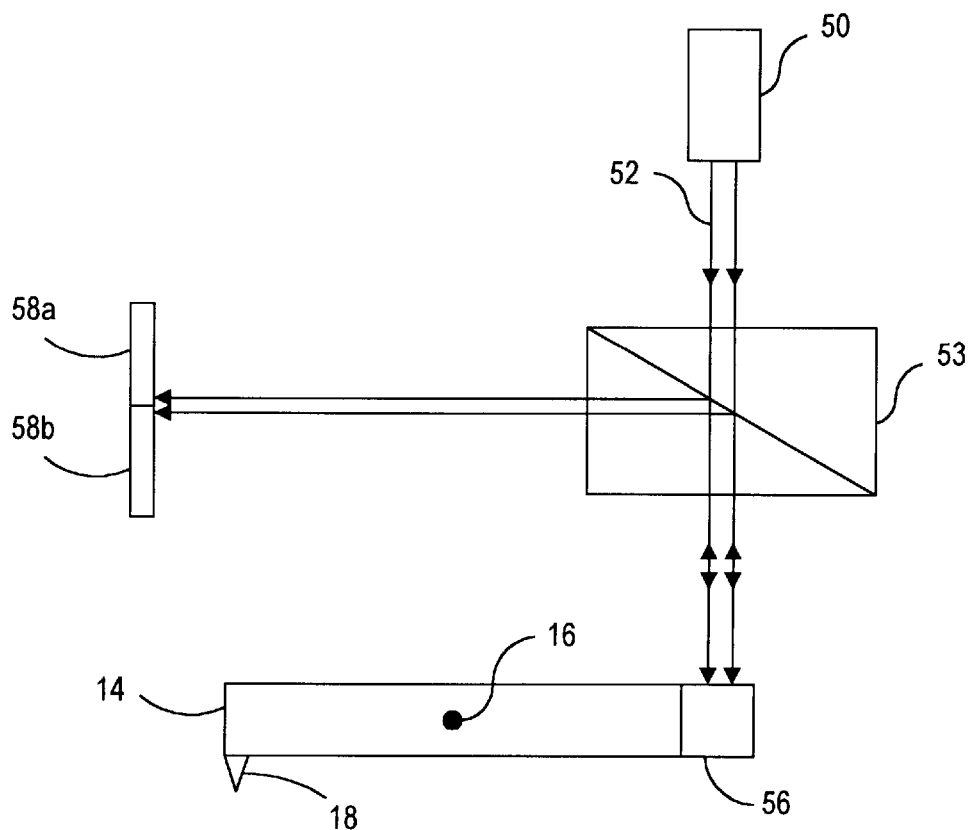
FIG. 3A is a representative schematic view of a stylus sensor employing a laser beam and a beam splitter for sensing changes in the position of the reflected laser beam as an indication of engraving stylus movement.

In FIG. 3A, another embodiment is shown where the stylus sensor 24 employs laser 50 which creates a laser beam 52. The laser beam 52 passes through a beam splitter 53 and onto a mirror 56 attached to the engraving stylus 14 which carries the diamond 18. The mirror 56 is attached to an end of the engraving stylus 14 opposite of the diamond 18, but could be placed on the same end as well. The laser beam 52 reflected from the mirror 58 is again reflected by the beam splitter 53 onto a split photodetector having two halves 58a and 58b, respectively.

The photodetector halves 58a,58b each detect a portion of the laser beam 52 and thereby indicate the position of the beam 52. When the engraving stylus 14 moves in response to an engraving command, the mirror 56 correspondingly moves the laser beam 52. The beam splitter 53 is set up to reflect the laser beam at an angle of approximately 90 degrees with respect to the original laser beam onto the photodetectors. The fraction of the laser beam 52 on each of the photodetector halves 58a,58b will depend very strongly on the position of the mirror 56. When the stylus 14 is stationary the current in the two halves of photocell 58a,58b called "X" and "Y", respectively are adjusted to be approximately equal. This adjustment can be made by physically moving the photocell 58a,58b. When the stylus moves, for example to make an indentation in the copper cylinder, the two currents are no longer equal and the difference current, X−Y would provide an indication of motion. This is improved upon by using a difference method represented by (X−Y)/(X+Y) to indicate motion because this ratio provides an electrical signal which is independent of the intensity of the light source itself and only responds to motion of the engraving stylus 14. This signal is compared with the command given to the engraving machine 10 in the manner described above.

Figure 3B:
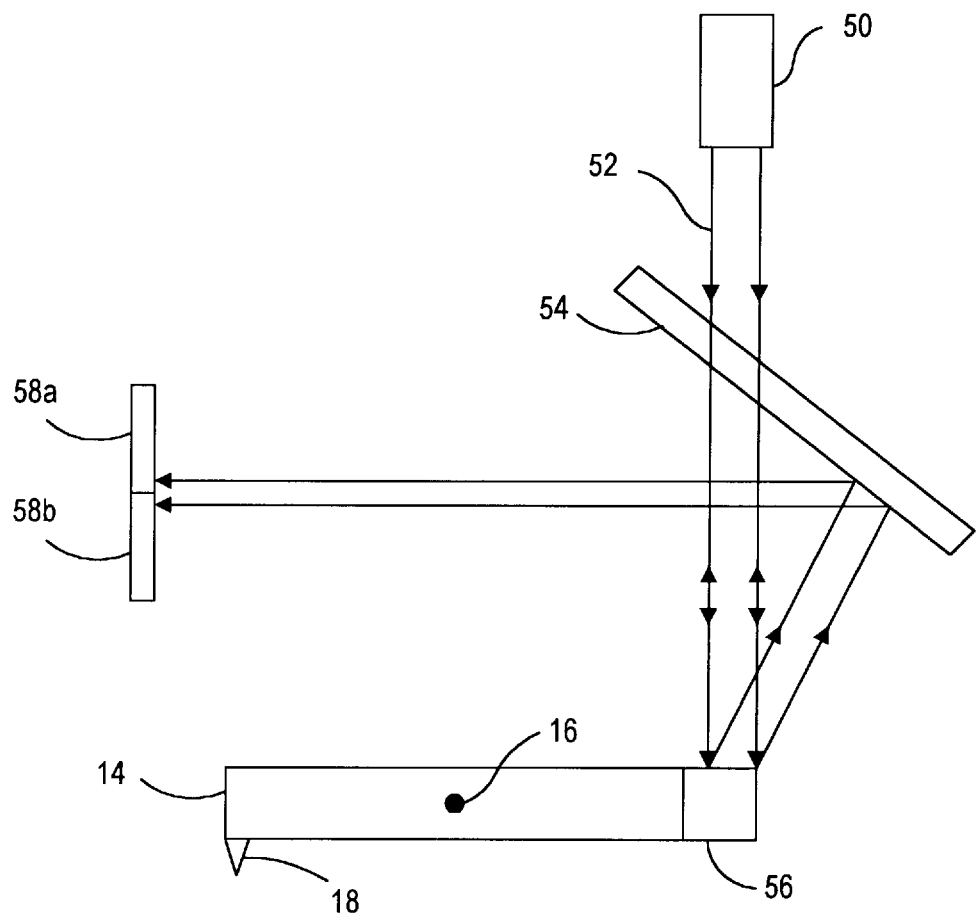
FIG. 3B is a representative schematic view of a stylus sensor employing a laser beam and a half silvered mirror for sensing changes in the position of a reflected beam of light as an indication of engraving stylus movement.

In FIG. 3B, another embodiment being less preferred to FIG. 3A is shown where the stylus sensor 24 employs laser 50 which creates a laser beam 52. The laser beam 52, which is planar, passes through a partially reflecting mirror 54, e.g., a half silvered mirror, and onto the mirror 56 attached to the engraving stylus 14 which carries the diamond 18. The mirror 56 is attached to an end of the engraving stylus 14 opposite of the diamond 18, but could be placed on the same end as well. The laser beam 52 reflected from the mirror 58 is further reflected by the partially reflecting mirror 54 onto both halves of the photodetector 58a and 58b. The photodetector halves 58a,58b each detect a portion of the laser beam 52 and thereby indicate the position of the beam 52. When the engraving stylus 14 moves in response to an engraving command, the mirror 56 correspondingly moves the laser beam 52. The partially reflecting mirror 54 is set up to reflect the laser beam 52 onto the photodetector halves 58a,58b. The fraction of the laser beam 52 on each of the photodetector halves 58a,58b will depend very strongly on the position of the mirror 56.

For example, in FIG. 3B a distance from the pivot 16 to the diamond 18 of 1 centimeter (cm) and a maximum motion of 15 micrometers ($\mu$M) yields an angle of rotation of 5 milliradians. The laser beam 52 is emitted by a single 4 milliwatt laser 50 with a total distance of 3 cm from the moving mirror 56 to the photodetectors 58a,58b. Approximately one milliwatt (MW) of light is lost from the laser beam 52 at the mirror 54 so that on the average there will be 0.5 MW in laser beam 52. The usual efficiency is about 0.3 amperes per watt ("A/W") so that the output in laser beam 52 will be 150 microamperes ("$\mu$A") on the average. For a 50 $\mu$M motion of the diamond 18 there is about 600 $\mu$m of motion of the laser beam 52 at the photodetector halves 58a,58b. The laser beam 52 has a diameter of 1 millimeter and the output of the laser beam 52 will vary from 0 to 300 $\mu$A. If we reflect laser beam 52 off of the partially reflecting mirror 54 then this angle will be doubled, giving a total deflection angle of 10 milliradians. Therefore, if the photodetectors 58a,58b were placed 1 centimeter (cm) away from the partially reflecting mirror 54, the actual motion would be 100 microns. This could easily be amplified by either moving the photodetectors 58a,58b further away or by using for example a mirror or prism to further divert the laser beam 52 to increase the effective distance without occupying too much space. Overall a total motion of the reflected light beam of a few hundred $\mu$m can be produced, which is easily detectable by the photodetector halves 58a,58b. The difference method described above is again employed to derive engraving stylus movement and cell volume.

Figure 3C:
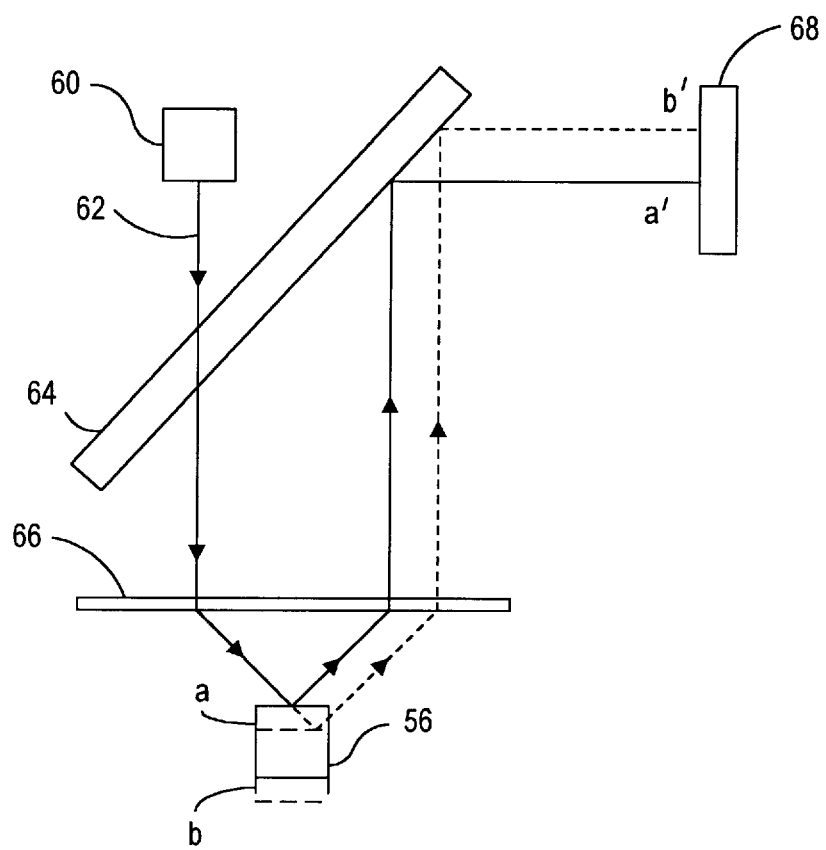
FIG. 3C is a representative schematic view of a stylus sensor employing a laser beam and a lens for sensing changes in the position of a reflected beam of light as an indication of engraving stylus movement.

In FIG. 3C, another embodiment being less preferred to FIG. 3A is shown where the stylus sensor 24 employs a laser 60 which creates a laser beam 62. The laser beam 62 passes through a partially reflecting mirror 64, e.g., a half silvered mirror, and onto a lens 66 of very short focal length. The lens 66 focuses the laser beam 62 onto the mirror 56 attached to the engraving stylus 14 which carries the diamond 18. The mirror 56 is attached to an end of the engraving stylus 14 opposite of the diamond 18, but could be placed on the same end as well. The mirror 56 moves between position $\alpha$ and position $\beta$ as illustrated in FIG. 3C. The laser beam 62 light reflected from the mirror 56 and passes back through the same lens 66 and is reflected by the partially reflecting mirror 64 onto a photodetector 68. The photodetector 68 detects the position of the laser beam 62. When the engraving stylus 14 moves in response to an engraving command, the mirror 56 correspondingly moves the laser beam 62. The lens 66 and the partially reflecting mirror 64 are set up to amplify the movement of the engraving stylus 14 such that the resulting displacement of the laser beam 62 is relatively larger on the photodetector 60. Thus, the position of that laser beam 62 on the photodetector 60 will depend very strongly on the position of the mirror 56. The photodetector 68 converts the laser beam's 62 position into electronic signals which are used to calibrate the next engraving command as described above. As described above, a difference method may be employed with this embodiment.

Figure 4:
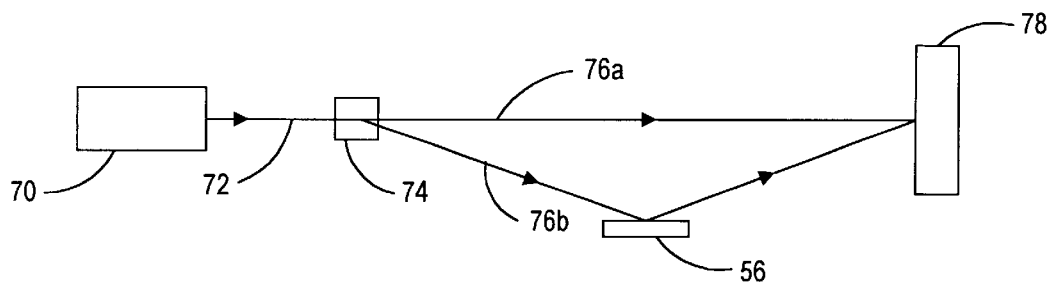
FIG. 4 is a representative schematic view of an engraving machine with a stylus sensor for sensing changes in an interference pattern as an indication of engraving stylus movement.

In FIG. 4, another embodiment is shown where the stylus sensor 24 employs a laser 70 which creates a laser beam 72. The laser beam 72 passes through a splitter 74 which produces a pair of laser beams 76a and 76b. One laser beam 76a continues on towards the detector, while the other laser beam 76b is reflected off of the mirror 56 attached to the engraving stylus 14 which carries the diamond 18. As the laser beams converge on a photodetector 78 they interfere with each other creating interference fringes. The photodetector converts the position and number of fringes into electronic signals. The electronic signals provide an indication of the distance the engraving stylus is displaced and are used to calibrate the next engraving command in the manner described above.

As illustrated in FIG. 5, in another embodiment the stylus sensor 24 measures changes in voltage in a piezoelectric rod 80 caused by changes in engraving stylus position. The piezoelectric rod 80 produces a voltage when bent that is part of a reversible process. The piezoelectric phenomenon is reversible in the sense that if the dimensions of the piezoelectric rod 80 are changed mechanically such as by compression or extension then a corresponding voltage will appear across the material.

In the embodiment, the voltage is measured with a voltmeter 82 and converted into electronic signals used in the present invention to determine the amount of error and to calibrate the next engraving command as described above. More specifically, the piezoelectric rod 80 is constructed as a bimorph, having a first piezoelectric material 84 lengthwise attached to a second piezoelectric material 86, each having differing piezoelectric properties, (also known as electrostriction). One end of the piezoelectric rod 80 is attached to the engraving stylus 14 while an other end of the piezoelectric rod 80 is attached to the engraving head 12. When the engraving stylus changes position in response to an engraving command, the piezoelectric rod 80 is mechanically bent. Bending the piezoelectric rod 80 causes a voltage corresponding to amount of deflection the rod has undergone to appear in the first piezoelectric material 84 and the second piezoelectric material 86. Because the materials chosen for the first piezoelectric material 84 differ from those chosen for the second piezoelectric material 86, each generate voltages different from the other in response to rod deflection. These voltages are comparatively measured by the voltmeter 82 which is electrically coupled, e.g., by wires, to each of the halves of the piezoelectric rod 80, specifically, the first piezoelectric material 84 and the second piezoelectric material 86, as illustrated in FIG. 5.

Figure 6:
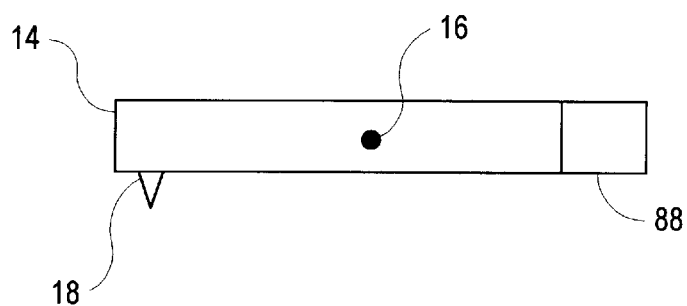
FIG. 6 is a representative schematic view of an engraving arm where the stylus sensor is an eddy current sensor mounted on the engraving arm.

As illustrated in FIG. 6, in another embodiment the stylus sensor 24 employs an eddy current sensor 88 mounted on the engraving stylus 14. The eddy current sensor employs a conducting coil carrying electrical current to create eddy currents in the copper coating of the gravure cylinder 22. Because the conducting coil is in a fixed position with respect to the engraving stylus 14, the strength of the induced eddy currents is proportional to the distance moved by the engraving stylus 14. Again, knowing the distance traversed by the engraving stylus 14 is useful in controlling the engraver 10. Calibration can occur either before an actual engraving job is performed or in realtime as the actual engraving job is being performed.

Figure 7:
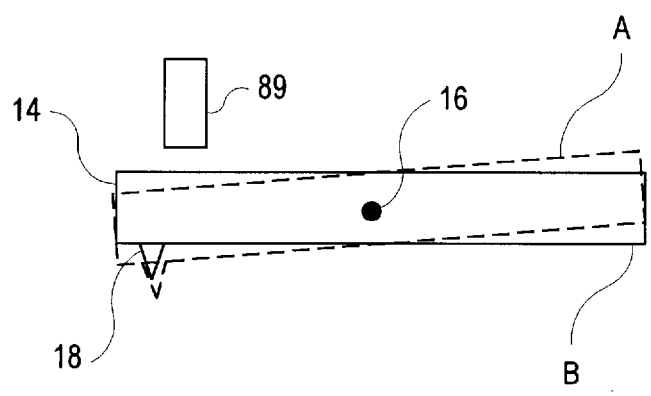
FIG. 7 is a representative schematic view of an engraving arm where the stylus sensor is an eddy current sensor mounted on the engraving head.

As illustrated in FIG. 7, in another embodiment the stylus sensor 24 employs an eddy current sensor 89 mounted on the engraving head 12. The eddy current sensor employs a conducting coil carrying electrical current to create eddy currents in the conductive material of the engraving stylus 14 arm. Because the conducting coil is in a fixed position with respect to the engraving head 12, the strength of the induced eddy currents is proportional to the distance moved by the engraving stylus 14.

A summation of all error measurements on any given engraved cylinder is also used to calculate the engravability of that cylinder. The engravability of a gravure cylinder is used as a measure of the quality of that cylinder. Such information is used in a quality assurance program and to separate acceptable from unacceptable gravure cylinders based on ranges of engravability. Furthermore, such engravability information can be used as part of a feedback loop to improve the manufacturing process. Another aspect of knowing engravability is that the price of a gravure cylinder can be related directly to the engravability of that cylinder. Moreover, a customer could be given a numerical assessment of the engravability of the cylinder with the price of that cylinder adjusted accordingly.

Thus, there has been described herein a new and useful method and apparatus for high resolution sensing of engraving stylus movement for dynamic calibration of an engraving machine and as a tool used to assist in the refinement of the gravure cylinder manufacturing process.

Many modifications and variations of the invention as set forth above can be made without departing from the spirit and scope of the invention and therefore only such limitations should be imposed as are indicated by the appended claims. For example, it is within the scope of the invention to combine different types of sensors into one embodiment.

What is claimed is:

1. A method for controlling an engraving machine, comprising the steps of:

issuing an engraving command to said engraving machine to engrave a gravure cylinder with a plurality of cells, said engraving machine having an engraving stylus;

dynamically determining the depth of a cell currently being engraved in response to said engraving command from a signal from an engraving stylus sensor;

comparing said depth with said engraving command to derive an error measurement; and dynamically adjusting said engraving machine before the next cell is engraved by an amount corresponding to said error measurement.

2. The method for controlling said engraving machine of claim 1, wherein said dynamically adjusting step further comprises adjusting a subsequent engraving command by an amount corresponding to said error measurement.

3. The method for controlling said engraving machine of claim 1, wherein said dynamically adjusting step further comprises adjusting every subsequent engraving command by an amount corresponding to said error measurement derived from each previous engraving command.

4. The method for controlling said engraving machine of claim 1, wherein said engraving stylus sensor comprises a capacitance sensor that produces said signal in response to a change in capacitance caused by movement of said engraving stylus.

5. The method for controlling said engraving machine of claim 4, wherein said engraving stylus sensor further comprises a first plate attached to said engraving stylus and a second plate that is substantially stationary with respect to said engraving stylus, said first plate being located in proximity to said second plate to produce said signal from a detectable change in capacitance when said engraving stylus significantly changes position.

6. The method for controlling said engraving machine of claim 5, wherein said engraving stylus sensor further comprises a third plate that is substantially stationary with respect to said engraving stylus, said first plate being positioned between said second plate and said third plate.

7. The method for controlling said engraving machine of claim 1, wherein said engraving stylus sensor further comprises a resistance sensor that produces said signal in response to a change in resistance caused by a change in proximity between said engraving stylus and said gravure cylinder.

8. The method for controlling said engraving machine of claim 1, wherein said engraving stylus sensor further comprises a impedance sensor that produces said signal in response to a change in impedance caused by a change in proximity between said engraving stylus and said gravure cylinder.

9. The method for controlling said engraving machine of claim 1, wherein said engraving stylus sensor further comprises a light source for generating light, said light reflected off of a reflecting surface attached to said engraving stylus, and a photodetector for sensing said light reflected off of said reflecting surface to produce said signal corresponding to movement of said engraving stylus.

10. The method for controlling said engraving machine of claim 9, wherein said light further comprises a substantially collimated and substantially coherent light beam, said light beam being reflected off of said reflecting surface and detected by a photodetector.

11. The method for controlling said engraving machine of claim 10, wherein said light beam is produced by a laser.

12. The method for controlling said engraving machine of claim 1, wherein said engraving stylus sensor further comprises a light source for generating a substantially collimated and coherent beam of light, means for passing some of said beam of light onto a reflecting surface attached to said engraving stylus, said beam of light reflecting off of said reflecting surface back onto said means for passing, said means for passing redirecting said beam of light onto a photodetector.

13. The method for controlling said engraving machine of claim 12, wherein said means for passing is a beam splitter.

14. The method for controlling said engraving machine of claim 12, wherein said means for passing is a partially reflecting mirror.

15. The method for controlling said engraving machine of claim 14, wherein said partially reflecting mirror is a half silvered mirror.

16. The method for controlling said engraving machine of claim 14, further comprising an optical lens.

17. The method for controlling said engraving machine of claim 1, wherein said engraving stylus sensor further comprises a light source for generating a substantially collimated and coherent beam of light, means for splitting said beam of light into a reference beam and a measurement beam, said measurement beam reflected off of a reflecting surface attached to said engraving stylus and optically interfering with said reference beam to create an interference pattern, and a photodetector for detecting said interference pattern to produce said signal corresponding to movement of said engraving stylus.

18. The method for controlling said engraving machine of claim 17, wherein said light source is a laser.

19. The method for controlling said engraving machine of claim 1, wherein said engraving stylus sensor further comprises a piezoelectric material having a first end attached to said engraving stylus and a second end held substantially immobile with respect to said first end, said piezoelectric material generating a voltage when said engraving stylus forces said piezoelectric material to change shape, said voltage being detected by a voltage meter that produces said signal corresponding to movement of said engraving stylus.

20. The method for controlling said engraving machine of claim 19, wherein said piezoelectric material is further comprised of two different piezoelectric materials attached together.

21. The method for controlling said engraving machine of claim 1 wherein said engraving stylus sensor further comprises an eddy current sensor that measures eddy currents induced in said gravure cylinder by said eddy current sensor, said eddy currents varying corresponding to said movement of said engraving stylus.

22. The method for controlling said engraving machine of claim 1 wherein said engraving stylus sensor further comprises an eddy current sensor that measures eddy currents induced in said engraving stylus by said eddy current sensor, said eddy currents varying corresponding to said movement of said engraving stylus.

23. The method for controlling said engraving machine of claim 1, wherein said dynamically adjusting step further comprises adjusting said engraving machine in less than 200 $\mu$S.

24. An apparatus for controlling an engraving machine, comprising:
means for issuing an engraving command to said engraving machine to engrave a gravure cylinder with a plurality of cells, said engraving machine having an engraving stylus;
means for dynamically determining the depth of a cell currently being engraved in response to said engraving command from a signal from an engraving stylus sensor;
means for comparing said depth with said engraving command to derive an error measurement; and
means for dynamically adjusting said engraving machine before the next cell is engraved by an amount corresponding to said error measurement.

25. The apparatus for controlling said engraving machine of claim 24, wherein said means for dynamically adjusting further comprises adjusting a subsequent engraving command by an amount corresponding to said error measurement.

26. The apparatus for controlling said engraving machine of claim 24, wherein said means for dynamically adjusting further comprises adjusting every subsequent engraving command by an amount corresponding to said error measurement derived from each previous engraving command.

27. The apparatus for controlling said engraving machine of claim 24, wherein said engraving stylus sensor comprises a capacitance sensor that produces said signal in response to a change in capacitance caused by movement of said engraving stylus.

28. The apparatus for controlling said engraving machine of claim 27, wherein said engraving stylus sensor further comprises a first plate attached to said engraving stylus and a second plate that is substantially stationary with respect to said engraving stylus, said first plate being located in proximity to said second plate to produce said signal from a detectable change in capacitance when said engraving stylus significantly changes position.

29. The apparatus for controlling said engraving machine of claim 28, wherein said engraving stylus sensor further comprises a third plate that is substantially stationary with respect to said engraving stylus, said first plate being positioned between said second plate and said third plate.

30. The apparatus for controlling said engraving machine of claim 24, wherein said engraving stylus sensor further comprises a resistance sensor that produces said signal in response to a change in resistance caused by a change in proximity between said engraving stylus and said gravure cylinder.

31. The method for controlling said engraving machine of claim 24, wherein said engraving stylus sensor further comprises a impedance sensor that produces said signal in response to a change in impedance caused by a change in proximity between said engraving stylus and said gravure cylinder.

32. The method for controlling said engraving machine of claim 24, wherein said engraving stylus sensor further comprises a light source for generating light, said light reflected off of a reflecting surface attached to said engraving stylus, and a photodetector for sensing said light reflected off of said reflecting surface to produce said signal corresponding to movement of said engraving stylus.

33. The method for controlling said engraving machine of claim 30, wherein said light further comprises a substantially collimated and substantially coherent light beam, said light beam being reflected off of said reflecting surface and detected by a photodetector.

34. The method for controlling said engraving machine of claim 33, wherein said light beam is produced by a laser.

35. The method for controlling said engraving machine of claim 24, wherein said engraving stylus sensor further comprises a light source for generating a substantially collimated and coherent beam of light, means for passing some of said beam of light onto a reflecting surface attached to said engraving stylus, said beam of light reflecting off of said reflecting surface back onto said means for passing, said means for passing redirecting said beam of light onto a photodetector.

36. The method for controlling said engraving machine of claim 35, wherein said means for passing is a beam splitter.

37. The method for controlling said engraving machine of claim 36, wherein said means for passing is a partially reflecting mirror.

38. The method for controlling said engraving machine of claim 37, wherein said partially reflecting mirror is a half silvered mirror.

39. The method for controlling said engraving machine of claim 38, further comprising an optical lens.

40. The apparatus for controlling said engraving machine of claim 24, wherein said engraving stylus sensor further comprises a light source for generating a substantially collimated and coherent beam of light, means for splitting said beam of light into a reference beam and a measurement beam, said measurement beam reflected off of a reflecting surface attached to said engraving stylus and optically interfering with said reference beam to create an interference pattern, and a photodetector for detecting said interference pattern to produce said signal corresponding to movement of said engraving stylus.

41. The apparatus for controlling said engraving machine of claim 40, wherein said light source is a laser.

42. The apparatus for controlling said engraving machine of claim 24, wherein said engraving stylus sensor further comprises a piezoelectric material having a first end attached to said engraving stylus and a second end held substantially immobile with respect to said first end, said piezoelectric material generating a voltage when said engraving stylus forces said piezoelectric material to change shape, said voltage being detected by a voltage meter that produces said signal corresponding to movement of said engraving stylus.

43. The apparatus for controlling said engraving machine of claim 42, wherein said piezoelectric material is further comprised of two different piezoelectric materials attached together.

44. The method for controlling said engraving machine of claim 24 wherein said engraving stylus sensor further comprises an eddy current sensor that measures eddy currents induced in said gravure cylinder by said eddy current sensor, said eddy currents varying corresponding to said movement of said engraving stylus.

45. The method for controlling said engraving machine of claim 24 wherein said engraving stylus sensor further comprises an eddy current sensor that measures eddy currents induced in said engraving stylus by said eddy current sensor, said eddy currents varying corresponding to said movement of said engraving stylus.

46. The apparatus for controlling said engraving machine of claim 24, wherein said means for dynamically adjusting further comprises adjusting said engraving machine in less than 200 $\mu S$.

47. A method for calculating a gravure cylinder's engravability, comprising the steps of:
issuing an engraving command to said engraving machine to engrave a gravure cylinder, said engraving machine having an engraving stylus;
deriving a measurement of movement of said engraving stylus in response to said engraving command with a signal from an engraving stylus sensor corresponding to said measurement of movement;
comparing said measurement of movement with an expected amount of movement of said engraving stylus corresponding to said engraving command to derive an error measurement; and
calculating from said error measurement said engravability of said gravure cylinder.

48. The method for calculating a gravure cylinder's engravability of claim 47, wherein said calculating step further comprises calculating for a plurality of error measurements said engravability of said gravure cylinder.

49. The method for calculating a gravure cylinder's engravability of claim 48, further comprising calculating engravability for at least one more gravure cylinders and identify and separating acceptable gravure cylinders from unacceptable gravure cylinders based at least in part on said calculated engravability for said gravure cylinders.

50. A method for controlling an engraving machine, comprising the steps of:
(a) issuing an engraving command to said engraving machine to engrave a gravure cylinder with a plurality of cells, said engraving machine having an engraving stylus;
(b) deriving a measurement of movement of said engraving stylus by evaluating signals from an engraving stylus sensor corresponding to a first position and a second position of the engraving stylus;
(c) comparing said measurement of movement with an expected amount of movement of said engraving stylus to derive an error measurement; and
(d) dynamically calibrating said engraving machine by an amount corresponding to said error measurement prior to engraving the next cell.

51. The method for controlling said engraving machine of claim 50, wherein said engraving stylus sensor comprises a capacitance sensor that produces said signal in response to a change in capacitance caused by movement of said engraving stylus.

52. The method for controlling said engraving machine of claim 50, wherein said engraving stylus sensor further comprises a light source for generating light, said light reflected off of a reflecting surface attached to said engraving stylus, and a photodetector for sensing said light reflected off of said reflecting surface to produce said signal corresponding to movement of said engraving stylus.

53. The method for controlling an engraving machine of claim 50, wherein said step (b) said engraving stylus sensor is a non-video sensor.

54. The method for controlling said engraving machine of claim 53, wherein said non-video sensor comprises a capacitance sensor that produces said signal in response to a change in capacitance caused by movement of said engraving stylus.

55. The method for controlling an engraving machine of claim 50, wherein said step (b) said engraving stylus sensor is a magnetic sensor.

56. The method for controlling said engraving machine of claim 55, wherein said magnetic sensor is an eddy current sensor that measures eddy currants induced in said gravure cylinder by said eddy current sensor, said eddy currents varying corresponding to said movement of said engraving stylus.

57. The method for controlling an engraving machine of claim 50, wherein said step (b) said engraving stylus sensor is all electric sensor.

58. The method for controlling said engraving machine of claim 57, wherein said electric sensor produces said signal in response to a change in capacitance caused by movement of said engraving stylus.

59. The method for controlling an engraving machine of claim 50, wherein said step (b) said engraving stylus sensor is a laser sensor.

60. The method for controlling said engraving machine of claim 59, wherein said laser sensor generates a laser beam, said laser beam being reflected off of a reflecting surface attached to said engraving stylus, and a photodetector senses said laser beam reflected off of said reflecting surface thereby producing said signal corresponding to movement of said engraving stylus.

61. An apparatus for controlling an engraving machine, comprising:
- a processor that issues an engraving command to said engraving machine to engrave a gravure cylinder with a plurality of cells, said engraving machine having an engraving stylus;
- a measurement device that dynamically determines the depth of a cell, in response to said engraving command, by evaluating a signal from an engraving stylus sensor;
- a comparator that compares said depth with said engraving command to derive an error measurement; and
- a control device that calibrates said engraving machine before the next cell is engraved by an amount corresponding to said error measurement.

62. The apparatus for controlling said engraving machine of claim 61, wherein said engraving stylus sensor comprises a capacitance sensor that produces said signal in response to a change in capacitance caused by movement of said engraving stylus.

63. The apparatus for controlling said engraving machine of claim 61, wherein, wherein said engraving stylus sensor further comprises a light source for generating light, said light reflected off of a reflecting surface attached to said engraving stylus, and a photodetector for sensing said light reflected off of said reflecting surface to produce said signal corresponding to movement of said engraving stylus.

64. An apparatus for controlling an engraving machine, comprising:
- a processor that issues an engraving command to said engraving machine to engrave a gravure cylinder with a plurality of cells, said engravings machine having an engraving stylus;
- a measurement device that determines the movement of said engraving stylus by evaluating signals from an engraving stylus sensor corresponding to a first position and a second position of the engraving stylus;
- a comparator that compares the movement of said engraving stylus with an expected amount of movement of said engraving stylus to derive an error measurement; and
- a control device that dynamically calibrates said engraving machine by an amount corresponding to said error measurement of the next cell.

65. The apparatus for controlling an engraving machine of claim 64, wherein said measurement device determines the movement of said engraving stylus, in response to said engraving command, by evaluating a signal, from an electric sensor, corresponding to said movement.

66. The apparatus for controlling said engraving machine of claim 65, wherein said electric sensor produces said signal in response to a change in capacitance caused by movement of said engraving stylus.

67. The apparatus for controlling said engraving machine of claim 64, wherein said measurement device that determines the movement of said engraving stylus, in response to said engraving command, by evaluating a signal, from a laser sensor, corresponding to said movement.

68. The apparatus for controlling said engraving machine of claim 67, wherein said laser sensor generates a laser beam, said laser beam being reflected off of a reflecting surface attached to said engraving stylus, and a photodetector senses said laser beam reflected off of said reflecting surface thereby producing said signal corresponding to movement of said engraving stylus.

69. The apparatus for controlling said engraving machine of claim 64, wherein said measurement device that determines the movement of said engraving stylus, in response to said engraving command, by evaluating a signal, from a magnetic sensor, corresponding to said movement.

70. The apparatus for controlling said engraving machine of claim 69, wherein said magnetic sensor is an eddy current sensor that measures eddy currents induced in said gravure cylinder by said eddy current sensor, said eddy currents varying corresponding to said movement of said engraving stylus.

* * * * *

UNITED STATES PATENT AND TRADEMARK OFFICE
CERTIFICATE OF CORRECTION

PATENT NO. : 5,818,605
DATED : October 6, 1998
INVENTOR(S) : Crewe, et al

It is certified that error appears in the above-identified patent and that said Letters Patent is hereby corrected as shown below:

Column 17, lines 26 - 40 and column 18, lines 1 - 3
IN THE CLAIMS:

Please amend issued claim 64 as follows:

64. An apparatus for controlling an engraving machine, comprising:

a processor that issues an engraving command to said engraving machine to engrave a gravure cylinder with a plurality of cells, said engraving machine having an engraving stylus;

a measurement device that determines the movement of said engraving stylus by evaluating signals from an engraving stylus sensor corresponding to a first position and a second position of the engraving stylus;

a comparator that compares the movement of said engraving stylus with an expected amount of movement of said engraving stylus to derive an error measurement; and

UNITED STATES PATENT AND TRADEMARK OFFICE
CERTIFICATE OF CORRECTION

PATENT NO. : 5,818,605
DATED : October 6, 1998
INVENTOR(S) : Crewe, et al

It is certified that error appears in the above-identified patent and that said Letters Patent is hereby corrected as shown below:

a control device that dynamically calibrates said engraving machine by an amount corresponding to said error measurement [of the next cell] prior to engraving the next cell.

Signed and Sealed this

Second Day of February, 1999

Attest:

Attesting Officer

Acting Commissioner of Patents and Trademarks